US012663664B2

(12) United States Patent
Heim et al.

(10) Patent No.: US 12,663,664 B2
(45) Date of Patent: Jun. 23, 2026

(54) COMPACT PIEZOELECTRIC PHOTONIC CRYSTAL MODULATOR

(71) Applicants: The MITRE Corporation, McLean, VA (US); National Technology & Engineering Solutions of Sandia, LLC, Albuquerque, NM (US); MASSACHUSETTS INSTITUTE OF TECHNOLOGY, Cambridge, MA (US)

(72) Inventors: David Heim, McLean, VA (US); Henry Wen, McLean, VA (US); Mark Dong, McLean, VA (US); Hugo Larocque, McLean, VA (US); Andrew Leenheer, McLean, VA (US); Gerald Gilbert, McLean, VA (US); Matthew Eichenfield, McLean, VA (US); Mikkel Heuck, McLean, VA (US); Dirk Englund, McLean, VA (US)

(73) Assignees: The MITRE Corporation, McLean, VA (US); National Technology & Engineering Solutions of Sandia, LLC, Albuquerque, NM (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 131 days.

(21) Appl. No.: 18/141,279

(22) Filed: Apr. 28, 2023

(65) Prior Publication Data

US 2023/0350236 A1     Nov. 2, 2023

Related U.S. Application Data

(60) Provisional application No. 63/336,874, filed on Apr. 29, 2022.

(51) Int. Cl.
*G02F 1/01* (2006.01)
*G06N 10/40* (2022.01)

(52) U.S. Cl.
CPC .......... *G02F 1/0134* (2013.01); *G06N 10/40* (2022.01)

(58) Field of Classification Search
CPC ...................................... G02F 1/0134
See application file for complete search history.

(56) References Cited

U.S. PATENT DOCUMENTS

| | | | | |
|---|---|---|---|---|
| 5,313,535 | A | * 5/1994 | Williams | .............. G02F 1/0134 385/14 |
| 7,092,606 | B2 | * 8/2006 | Wong | ..................... B82Y 20/00 385/5 |

(Continued)

OTHER PUBLICATIONS

D. Heim et al. Compact piezoelectric photonic crystal modulator in a visible-NIR 200 mm CMOS architecture. Conference on Lasers and Electro-Optics, Technical Digest Series (Optica Publishing Group, 2022), paper STu5G.1, May 2022. (https://doi.org/10.1364/CLEO_SI.2022.STu5G.1) (Year: 2022).*

(Continued)

*Primary Examiner* — Michael Stahl
(74) *Attorney, Agent, or Firm* — Morrison & Foerster LLP

(57) ABSTRACT

Provided herein is a photonic modulator and methods for controlling a photonic modulator that can control the phase and/or amplitude of photons being transmitted through the modulator to minimize photonic loss while remaining power efficient and operating at high speeds. The photonic modulator can include a substrate with a pair of piezoelectric cantilevers spaced apart from one another by a gap, with a photonic waveguide disposed in the substrate that extends across the modulator and bridges the gap between the piezoelectric cantilevers. In one or more examples, the (Continued)

piezoelectric cantilevers can be configured to move away from the substrate in response to an electrical signal, such that a refractive index of the photonic waveguide is altered.

30 Claims, 11 Drawing Sheets

(56)　　　　　　References Cited

U.S. PATENT DOCUMENTS

| | | | | |
|---|---|---|---|---|
| 11,569,431 | B1 * | 1/2023 | Eichenfield .......... | H10N 30/045 |
| 2002/0039467 | A1 * | 4/2002 | Amantea .............. | G02B 6/3536 |
| | | | | 385/16 |
| 2023/0145261 | A1 * | 5/2023 | Handanhal Ramachandra .......... | |
| | | | | G02B 6/125 |
| | | | | 385/37 |
| 2023/0351235 | A1 * | 11/2023 | Clark ..................... | G06N 10/20 |

OTHER PUBLICATIONS

Bogaerts et al. (Oct. 7, 2020). "Programmable photonic circuits," Nature 586:207-216.

Dong et al. (May 2021). "High-speed programmable photonic circuits in a cryogenically compatible, visible-NIR 200 mm CMOS architecture," arXiv:2105.12531:19 pages.

Heuck et al. (Jul. 15, 2013). "Improved switching using Fano resonances in photonic crystal structures," Optics Letters 38(14):2466-2468.

Luke et al. (Aug. 3, 2020). "Wafer-scale low-loss lithium niobate photonic integrated circuits" Optics Express 28(17), 24452-24458.

Stanfield et al. (Sep. 20, 2019). "CMOS-compatible, piezo-optomechanically tunable photonics for visible wavelengths and cryogenic temperatures" Optics Express 27(20): 28588-28605.

* cited by examiner

100

200

208

210

202     204     206     204

210

-40     -20     0(um)     20     40

212

700

900

910

920

930

Figure 10:
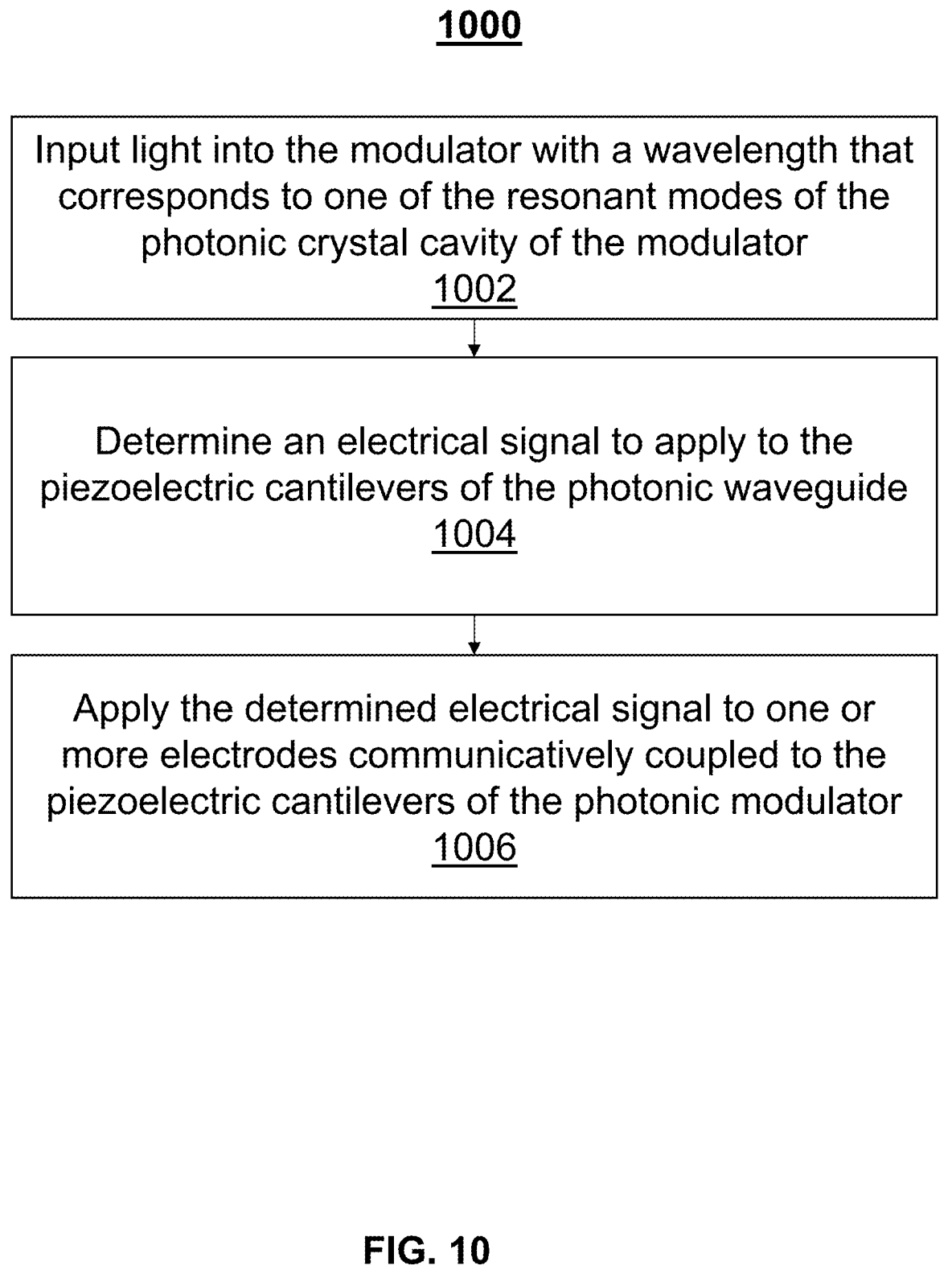

1000

```
┌─────────────────────────────────────────────────────┐
│  Input light into the modulator with a wavelength that │
│   corresponds to one of the resonant modes of the      │
│       photonic crystal cavity of the modulator         │
│                        1002                            │
└─────────────────────────────────────────────────────┘
                           │
                           ▼
┌─────────────────────────────────────────────────────┐
│       Determine an electrical signal to apply to the   │
│   piezoelectric cantilevers of the photonic waveguide  │
│                        1004                            │
└─────────────────────────────────────────────────────┘
                           │
                           ▼
┌─────────────────────────────────────────────────────┐
│     Apply the determined electrical signal to one or   │
│    more electrodes communicatively coupled to the      │
│  piezoelectric cantilevers of the photonic modulator   │
│                        1006                            │
└─────────────────────────────────────────────────────┘
```

COMPACT PIEZOELECTRIC PHOTONIC CRYSTAL MODULATOR

CROSS REFERENCE TO RELATED APPLICATIONS

This application claims the benefit of U.S. Provisional Application No. 63/336,874, filed Apr. 29, 2022, the entire contents of which is incorporated herein by reference.

This invention was made under CRADA/PTS No. SC19/1945.00.00 between The MITRE Corporation and National Technology & Engineering Solutions of Sandia, LLC operated for the United States Department of Energy. This invention was also made under contract No. DE-NA0003525 between National Technology & Engineering Solutions of Sandia, LLC and the United States Department of Energy/National Nuclear Security Administration.The Government has certain rights in this invention.

FIELD OF THE DISCLOSURE

This disclosure relates to systems and methods for a photonic modulator, and in particular, to a piezoelectric photonic modulator capable of controlling photonic transmission by strain-tuning piezoelectric structures.

BACKGROUND OF THE DISCLOSURE

Optical switches are one method of controlling the states of qubits in quantum systems. Optical switches, and in particular photonic switches, can be used to modulate (i.e., selectively control the phase and/or amplitude) of photons in order to generate the states of qubits that are necessary to perform quantum computing measurements. Photonic switches used in quantum computing systems must generally be capable of high fidelity and fast operation to accomplish the protocols necessary to generate the appropriate states of the qubits. The need for low energy consumption, low cross-talk, and high-speed operation, however, necessitates using a modulator that does not rely on thermo-optic effects. In one or more examples, modulators that rely on the Pockels-effect (an electro-optic effect) can meet the above requirements. Nonetheless, such modulators typically require waveguide material platforms that are currently not feasible. Accordingly, there exists a need for modulator for controlling the phase and/or amplitude of photonic transmission that is power efficient, high-speed, and low-loss.

SUMMARY OF THE DISCLOSURE

Accordingly, provided herein is a photonic modulator and methods for controlling a photonic modulator that can control the phase and/or amplitude of photons being transmitted through the modulator to minimize photonic loss while remaining power efficient and operating at high speeds. The photonic modulator can include a substrate with a pair of piezoelectric cantilevers spaced apart from one another by a gap with a photonic waveguide that extends across the modulator and bridges the gap between the piezoelectric cantilevers.

In one or more examples, the piezoelectric cantilevers can be communicatively coupled to one or more electrodes such when an electrical signal is applied to the electrodes the piezoelectric cantilevers each generate an electric field and thereby mechanically deform away from a resting position. In one or more examples, the mechanical deformation of the piezoelectric cantilevers can induce a strain on the portion of the photonic waveguide that bridges the gap between the piezoelectric cantilevers. By selectively inducing the strain (i.e., by strain-tuning) in the photonic waveguide, the photonic modulator can be configured to alter a refractive index of the photonic waveguide. Thus, in one or more examples, the refractive index of the photonic waveguide can be strain-tuned to reflect or transmit certain waveguides of light. In one or more examples, changes to the refractive index of the photonic waveguide can cause a change in the resonant frequency of the waveguide.

In one or more examples, a photonic modulator comprises: a substrate, a photonic waveguide disposed within the substrate, a first piezoelectric cantilever disposed in the substrate, wherein at least a portion of the first cantilever is configured to move away from the substrate in response to an electrical signal applied to it, a second piezoelectric cantilever disposed in the substrate, wherein at least a portion of the second cantilever is configured to move away from the substrate in response to the electrical signal applied to it, wherein the first and second piezoelectric substrate are spaced apart on the substrate by a gap, and wherein the photonic waveguide is disposed on the substrate such that it bridges the gap formed by the first piezo electric cantilever and the second piezoelectric cantilever, and one or more electrodes, wherein each electrode is communicatively coupled to either the first piezoelectric cantilever or the second piezoelectric cantilever or both, and wherein the one or more electrodes are configured to receive one or more electrical signals that when applied to the first cantilever, the second cantilever, or both, cause at least the portions of the first and second cantilevers to move away from the substrate such that a refractive index of the photonic waveguide is altered as a result of the movement of the first and second piezoelectric cantilevers.

Optionally, the substrate comprises a complementary metal-oxide-semiconductor compatible material.

Optionally, the photonic waveguide comprises a silicon nitride waveguide.

Optionally, the photonic waveguide comprises a silicon dioxide cladding.

Optionally, the first and second piezoelectric cantilevers comprise an aluminum nitride piezoelectric stack.

Optionally, the first and second piezoelectric cantilevers are disposed on the substrate such that they the photonic waveguide is physically deformed when an electrical signal is applied to the one or more electrodes that are communicatively coupled to the either the first piezoelectric cantilever or the second piezoelectric cantilever or both.

Optionally, the electrical signal applied to the one or more electrodes that are communicatively coupled to the either the first piezoelectric cantilever or the second piezoelectric cantilever or both is a direct current (DC) signal.

Optionally, the electrical signal applied to the one or more electrodes that are communicatively coupled to either the first piezoelectric cantilever or the second piezoelectric cantilever or both is an alternating current (AC) signal.

Optionally, the photonic waveguide comprises a cavity region that is located on a portion of the photonic waveguide that bridges the gap.

Optionally, the cavity region comprises layers of silicon nitride and silicon dioxide.

In one or more examples, a method for controlling a photonic modulator, the method comprises: applying an electrical signal to the photonic modulator, wherein the photonic modulator comprises: a substrate, a photonic waveguide disposed within the substrate, a first piezoelectric cantilever disposed in the substrate, wherein at least a portion of the first cantilever is configured to move away from the substrate in response to an electrical signal applied to it, a second piezoelectric cantilever disposed in the substrate, wherein at least a portion of the second cantilever is configured to move away from the substrate in response to the electrical signal applied to it, wherein the first and second piezoelectric substrate are spaced apart on the substrate by a gap, and wherein the photonic waveguide is disposed on the substrate such that it bridges the gap formed by the first piezo electric cantilever and the second piezoelectric cantilever, and one or more electrodes, wherein each electrode is communicatively coupled to either the first piezoelectric cantilever or the second piezoelectric cantilever or both, and wherein the one or more electrodes are configured to receive one or more electrical signals that when applied to the first cantilever, the second cantilever, or both, cause at least the portions of the first and second cantilevers to move away from the substrate such that a refractive index of the photonic waveguide is altered as a result of the movement of the first and second piezoelectric cantilevers; wherein applying the electrical signal comprises: selecting a desired resonant frequency for the photonic waveguide, determining an electrical signal to apply to the first and second piezoelectric cantilevers based on the selected desired resonant frequency for the photonic waveguide, and applying the determined electrical signal to the one or more electrodes of the photonic modulator based on the determined electrical signal.

Optionally, the substrate comprises a complementary metal-oxide-semiconductor compatible material.

Optionally, the photonic waveguide comprises a silicon nitride waveguide.

Optionally, the photonic waveguide comprises a silicon dioxide cladding.

Optionally, the first and second piezoelectric cantilevers comprise an aluminum nitride piezoelectric stack.

Optionally, the first and second piezoelectric cantilevers are disposed on the substrate such that they the photonic waveguide is physically deformed when an electrical signal is applied to the one or more electrodes that are communicatively coupled to the either the first piezoelectric cantilever or the second piezoelectric cantilever or both.

Optionally, the electrical signal applied to the one or more electrodes that are communicatively coupled to the either the first piezoelectric cantilever or the second piezoelectric cantilever or both is a direct current (DC) signal.

Optionally, the electrical signal applied to the one or more electrodes that are communicatively coupled to either the first piezoelectric cantilever or the second piezoelectric cantilever or both is an alternating current (AC) signal.

Optionally, the photonic waveguide comprises a cavity region that is located on a portion of the photonic waveguide that bridges the gap.

Optionally, the cavity region comprises layers of silicon nitride and silicon dioxide.

In one or more examples, a non-transitory computer readable storage medium storing one or more programs for controlling a photonic modulator, for execution by one or more processors of an electronic device that when executed by the device, causes the device to: apply an electrical signal to the photonic modulator, wherein the photonic modulator comprises: a substrate, a photonic waveguide disposed within the substrate, a first piezoelectric cantilever disposed in the substrate, wherein at least a portion of the first cantilever is configured to move away from the substrate in response to an electrical signal applied to it, a second piezoelectric cantilever disposed in the substrate, wherein at least a portion of the second cantilever is configured to move away from the substrate in response to the electrical signal applied to it, wherein the first and second piezoelectric substrate are spaced apart on the substrate by a gap, and wherein the photonic waveguide is disposed on the substrate such that it bridges the gap formed by the first piezo electric cantilever and the second piezoelectric cantilever, and one or more electrodes, wherein each electrode is communicatively coupled to either the first piezoelectric cantilever or the second piezoelectric cantilever or both, and wherein the one or more electrodes are configured to receive one or more electrical signals that when applied to the first cantilever, the second cantilever, or both, cause at least the portions of the first and second cantilevers to move away from the substrate such that a refractive index of the photonic waveguide is altered as a result of the movement of the first and second piezoelectric cantilevers; wherein applying the electrical signal comprises: selecting a desired resonant frequency for the photonic waveguide, determining an electrical signal to apply to the first and second piezoelectric cantilevers based on the selected desired resonant frequency for the photonic waveguide, and applying the electrical signal to the one or more electrodes of the photonic modulators based on the determined electrical signal.

Optionally, the substrate comprises a complementary metal-oxide-semiconductor compatible material.

Optionally, the photonic waveguide comprises a silicon nitride waveguide.

Optionally, the photonic waveguide comprises a silicon dioxide cladding.

Optionally, the first and second piezoelectric cantilevers comprise an aluminum nitride piezoelectric stack.

Optionally, the first and second piezoelectric cantilevers are disposed on the substrate such that they the photonic waveguide is physically deformed when an electrical signal is applied to the one or more electrodes that are communicatively coupled to the either the first piezoelectric cantilever or the second piezoelectric cantilever or both.

Optionally, the electrical signal applied to the one or more electrodes that are communicatively coupled to the either the first piezoelectric cantilever or the second piezoelectric cantilever or both is a direct current (DC) signal.

Optionally, the electrical signal applied to the one or more electrodes that are communicatively coupled to either the first piezoelectric cantilever or the second piezoelectric cantilever or both is an alternating current (AC) signal.

Optionally, the photonic waveguide comprises a cavity region that is located on a portion of the photonic waveguide that bridges the gap.

Optionally, the cavity region comprises layers of silicon nitride and silicon dioxide.

It will be appreciated that any of the variations, aspects, features and options described in view of the systems can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

The invention will now be described, by way of example only, with reference to the accompanying drawings, in which:

FIG. 10 depicts an exemplary method for modulating light directed through a piezoelectric photonic crystal modulator, in accordance with one or more examples of the disclosure.

DETAILED DESCRIPTION OF THE INVENTION

Figure 1:
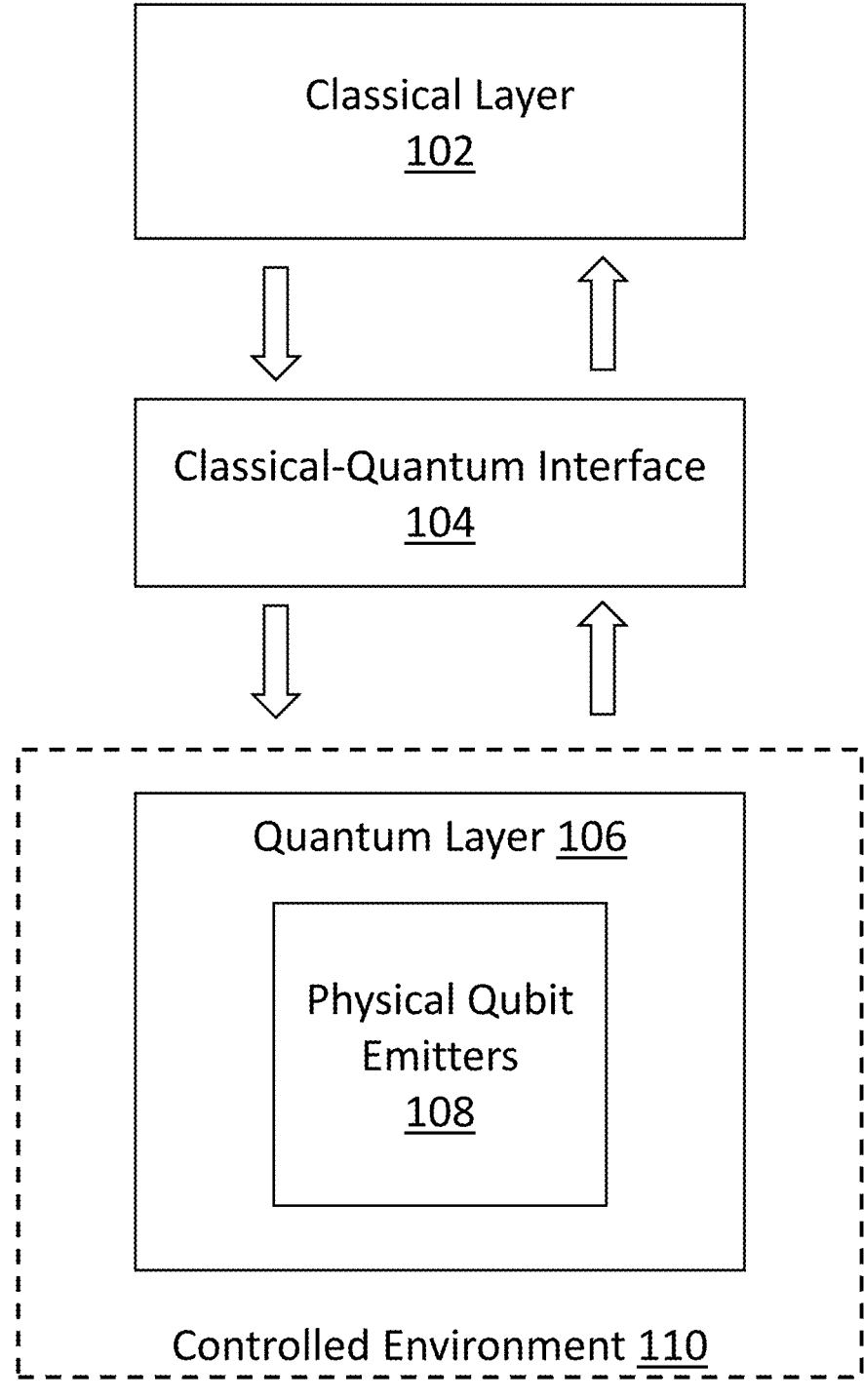
FIG. 1 illustrates an exemplary quantum computing system according to one or more examples of the present disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Classical computers perform calculations using information represented by binary digits (or "bits" for short). Each bit in a classical computing system can occupy one of two discrete states: a first state ("0") or a second state ("1"). In the absence of any external forces, a classical system such as a bit will occupy a single, well-defined state indefinitely. Quantum computers, on the other hand, perform calculations using information encoded in the quantum states of two-state quantum systems called "quantum bits" (or "qubits" for short). A quantum system can "collapse", with a certain probability, to any physically allowed state when a measurement of the system's state is performed. Since the measurement result is probabilistically determined, several measurements of the state of the same quantum system will not necessarily yield the same result. This is because, unlike a classical system—which can only exist in one of its possible states—a quantum system such as a qubit can exist in any "superposition" (i.e., combination) of the independent, physically distinguishable quantum states in which the system can be observed or measured. This superposition state contains information about each of the possible independent quantum states as well as information related to the probability of observing the quantum system in each of the possible independent states. Since a quantum superposition state contains more information than a classical state, a single qubit (which can exist in any superposition of two independent states) is capable of representing a greater amount of information than a single classical bit (which can exist in only a single state at a time). As a result, quantum computers are theorized to be capable of solving complex computational problems which classical computers are incapable of solving in practical amounts of time.

Although quantum computing systems have the potential to solve problems that classical computers cannot, quantum computing systems present various design challenges. Quantum computers store information in the quantum states of qubits; as such, the ability to accurately and precisely control the quantum states of qubits is absolutely essential to the development of scalable, functioning quantum computing systems. Quantum systems, however, are inherently fragile; as such, storing information in a quantum state for extended periods of time is difficult. Small fluctuations (e.g., thermal fluctuations) in the environment surrounding a system of qubits, for example, can disturb the state of the system and cause "decoherence", which renders the quantum information contained in the qubit system inaccessible. One method of controlling the qubit states is to house systems of qubits in cryogenic environments (i.e., environments at temperatures below about −180° C./−292° F./93 K). Maintaining the controlled environment at cryogenic temperatures can reduce thermal fluctuations in the controlled environment, which may otherwise disturb the state of the qubit system. However, maintaining the environment at cryogenic temperatures means the any physical hardware used within the controlled environment must be capable of operating efficiently in a cryogenic environment. In addition, other mechanisms of qubit control beyond controlling the environment are needed in order to successfully perform quantum computations. These control mechanisms need to be scalable, accurate, and capable of functioning alongside one another.

FIG. 1 illustrates an exemplary quantum computing system according to one or more examples of the present disclosure. As shown, the quantum computing system 100 includes a classical layer 102, a classical-quantum interface 104, and a quantum layer 106. In one or more examples, the quantum computing system 100 can be configured to perform computations by recording information during the "collapsed" state of qubits when they are being measured, extracting this information via the classical-quantum interface 104, and relaying the information to the classical layer 102 where it can be processed and analyzed.

The classical layer 102 can include traditional computing devices such as CPUs and GPUs. In one or more examples, the classical layer 102 may include one or more user interfaces configured to receive input from a user. In one or more examples, the classical layer 102 may include one or more displays. The displays may be configured to provide users with information related to computations being performed by quantum computing system 100. In one or more examples, the classical layer 102 can be configured to compile instructions for a given quantum algorithm to be executed by the quantum computing system 100. In one or more examples, the classical layer 102 can process quantum-state measurements received from the classical-quantum interface 104 after the quantum algorithm is executed. Executing the quantum algorithm can include generating a series of signals such as voltage sweeps, microwave pulses, optical pulses, etc., via a suitable device.

The quantum layer 106 can be contained in a controlled environment 110, and can include physical qubit emitters 108. In one or more examples, the controlled environment 110 can be maintained at cryogenic temperatures. For example, the controlled environment may be maintained at temperatures below about −180° C./−292 ° F./93 K.

In one or more examples, the physical qubit emitters 108 can be configured to generate physical implementations of qubits—i.e., configured to generate and encode information in the quantum states of a plurality of two-state quantum systems. The physical qubit emitters 108 can generate a variety of physical implementations of qubits. Such physical implementations can include, in non-limiting examples, electrons, which can occupy a superposition state that is a combination of a spin up state and a spin down state; photons, which can occupy a superposition state that is a combination of a horizontal polarization state and a vertical polarization state; and superconducting "islands" formed using Josephson junctions, which can occupy a superposition state that is a combination of an uncharged state and a charged state. In one or more examples, physical qubit emitters 108 may generate "hybrid" quantum systems which combine multiple quantum degrees of freedom—for example, a hybrid qubit formed from a coupling of an electron and a photon. As explained above, the qubit is the quantum analogue to a classical bit. Accordingly, in one or more examples, the physical qubit emitters 108 can be the quantum analog to transistors, which control bits in a classical computer.

In one or more examples, information may be transmitted between the classical layer 102 and the quantum layer 106 via a classical-quantum interface 104. For instance, a user may provide an algorithm or a problem to be solved to a computing device in the classical layer 102. The classical layer 102 can compile instructions based on the provided algorithm or problem and provide those instructions to the classical-quantum interface 104, which can then create the various kinds of signals necessary to control the qubits in the quantum layer 106 based on the instructions.

The classical-quantum interface 104 may comprise one or more classical circuits configured to perform a plurality of tasks related to controlling the states of the qubits generated in quantum hardware layer 106. Such circuits may include digital-to-analogue converters, amplifiers, which may facilitate the transmission of information between qubits, as well as field-programmable gate arrays (FPGAs) and application-specific integrated circuits (ASICs), which may be implemented in feedback systems configured to control the qubit states based on measurements of the states of the qubits. Once necessary information has been extracted from the quantum layer 106, it may be uploaded to the classical layer 102 for further processing and analysis.

As discussed above, photonic switches used in quantum computing systems, such as the quantum computing system 100 of FIG. 1, must generally be capable of high fidelity and fast operation to accomplish the protocols necessary to generate the appropriate states of the qubits. The present disclosure is directed to systems and methods for a compact piezoelectric photonic crystal (PhC) modulator capable of controlling the transmission of light by strain-tuning a Bragg-grating type structure. In one or more examples, the piezoelectric PhC modulator can include a PhC cavity that is mechanically coupled to a piezoelectric stack, with the transmission of photons through the PhC cavity capable of being selectively controlled based on strain induced by actuation of the piezoelectric stack. In one or more examples, the piezoelectric PhC modulator can be used to control the transmission of photons as a frequency-dependent switch, a frequency filter, a phase shifter, etc. The piezoelectric PhC modulator of the present invention can be used to control the transmission of photons and/or visible light. In some embodiments, the frequencies of the piezoelectric PhC modulator may be in the gigahertz frequency range (e.g., resonant amplitude modulation, frequency modulation, between 2.5-3.0 GHz).

Figure 2A:
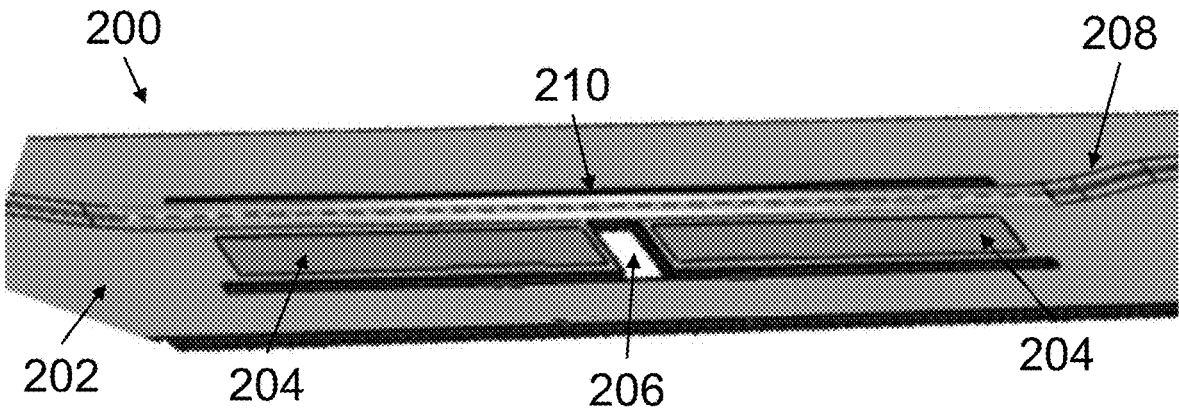
FIG. 2A depicts an exemplary photonic crystal modulator, in accordance with one or more examples of the disclosure.

FIG. 2A depicts an exemplary photonic crystal modulator 200, in accordance with one or more examples of the disclosure. The modulator 200 can be integrated in a CMOS (complementary metal-oxide semiconductor) architecture. In one or more examples, the modulator 200 can provide phase and amplitude modulation that is power efficient, high-speed, and low-loss.

As shown in FIG. 2A, the modulator 200 includes a substrate 202 with an integrated photonic waveguide 208 that extends across the substrate 202. In one or more examples, the substrate can be a CMOS-compatible material. The modulator 200 also includes a pair of piezoelectric cantilevers 204 spaced apart from one another by a gap 206 with the photonic waveguide 208 connected to both of the piezoelectric cantilevers 204 such that the photonic waveguide 208 bridges the gap 206. In one or more examples, gap 206 may have a variable width and depth. For example, gap 206 may be between 1-20 microns wide and 5-15 microns deep. The dimensions of gap 206 may concentrate the strain field with the electric field of photonic crystal cavity mode. In one or more examples, gap 206 may be designed with alternative shapes, such as a semi-circular or a semi-ovular shape to further concentrate and co-locate the strain field with the optical field. In some embodiments, gap 206 and waveguide 208 may include "air-modes." The air-modes may correspond to cavity modes having strong electric fields in silicon dioxide rather than silicon nitride, which may be used to further enhance the net strain-light overlap. The photonic waveguide also includes a cavity region 210 which is depicted in a magnified view in FIG. 2B and will be discussed below. In one or more examples, the photonic waveguide 208 can be a silicon nitride waveguide. The photonic waveguide 208 can include a silicon dioxide cladding.

In one or more examples, the piezoelectric cantilevers 204 can each be connected to the substrate on only one end such that the piezoelectric cantilevers 204 are free to mechanically deform (i.e., flex). The piezoelectric cantilevers 204 can be configured to mechanically deform when an electrical signal is applied to the modulator. In one or more examples, the piezoelectric cantilevers 204 can be configured to mechanically deform away from the substrate 202. For example, the piezoelectric cantilevers 204 can be configured to flex in an upward direction relative to the substrate 202.

The piezoelectric cantilevers 204 can also be configured to flex in a downward direction relative to the substrate 202. In one or more examples, the piezoelectric cantilevers can be configured to flex in both the upward and downward direction relative to the substrate 202. The modulator 200 can be configured such that the piezoelectric cantilevers 204 mechanically deform when an electrical signal is applied to one or both of the piezoelectric cantilevers 204. The piezoelectric cantilevers 204 can include an aluminum nitride stack, as will be discussed further below.

In some embodiments, and as will be discussed further below, the mechanical deformation of the piezoelectric cantilevers 204 can induce an optical change on the photonic waveguide 208. For instance, the mechanical deformation of the piezoelectric cantilevers 204 can alter a refractive index of the photonic waveguide 208. As an example, the effective optical path length of photonic waveguide 208 may be altered by approximately $0.5\text{-}1\times10^{-6}$ through a combination of the strain-optic and moving boundary effects. In some embodiments, the optical change induced in the photonic waveguide 208 is a result of physical deformation of the photonic waveguide 208. The mechanical deformation of the piezoelectric cantilevers 204 can induce a strain in the piezoelectric cantilevers 204. In one or more examples, the strain in the piezoelectric cantilevers 204 can cause the optical change of the photonic waveguide 208. In one or more examples, the piezoelectric cantilevers 204 can be configured to cause the refractive index of the photonic waveguide 208 to adjust. That is, the piezoelectric cantilevers 204 can be configured to alter the refractive index of the photonic waveguide 208 by applying an electrical signal to the modulator 200. The electrical signal can be applied to the modulator 200 via electrodes that are communicatively coupled to one or both of the piezoelectric cantilevers 204. In some embodiments, the adjustment to the refractive index may be a result of a non-volatile strain tuning performed to cantilevers 204. The non-volatile strain tuning may be performed via mechanical hysteresis arising from non-linear mechanical buckling the electrodes and/or from ferroelectric hysteresis of the piezoelectric layer of piezoelectric cantilevers 204. In one or more examples, the electrical signal can be a direct current (DC) signal. In one or more examples, the electrical signal can be an alternating current (AC) signal.

The cavity region 210 of the photonic waveguide 208 can be configured to act as a frequency-dependent filter, whereby modulating the device shifts the wavelengths of light that are allowed to pass through the cavity region 210. In one or more examples, the strain induced on the piezoelectric cantilevers 204 by the application of electrical signal can selectively control the transmission frequency of the cavity region 210, thus enabling the modulator 200 to act as a strain-tuned Bragg-grating type structure. In some embodiments, frequency modulation of the photonic waveguide 208 may enable high speed pulse carving for cyclical switching excitations of quantum emitters and/or can enable frequency shifting of photons for frequency multiplexing and controlling the spectral indistinguishability of photons. In one or more examples, the resonant amplitude modulation of the photonic waveguide 208 may be in the 2.5-3.0 GHz spectral range and the frequency modulation/shifting of the photonic waveguide 208 may be 2.5-3.0 GHz. However, a person of ordinary skill in the art will recognize that the spectral range and frequency modulation/shifting may differ. For example, the spectral range of the photonic waveguide 208 may be less than 1.0 GHz, between 1.0-2.0 GHz, between 1.0-5.0 GHz, between 1.0 and 10.0 GHz, or frequencies greater than 10 GHz. As another example, the frequency modulation/ shifting of the photonic waveguide 208 may be 0.5 GHz or more, 1.0 GHz or more, 2.5 GHz or more, 5.0 GHz, or more, 10.0 GHz or more, or other frequencies.

Figure 2B:
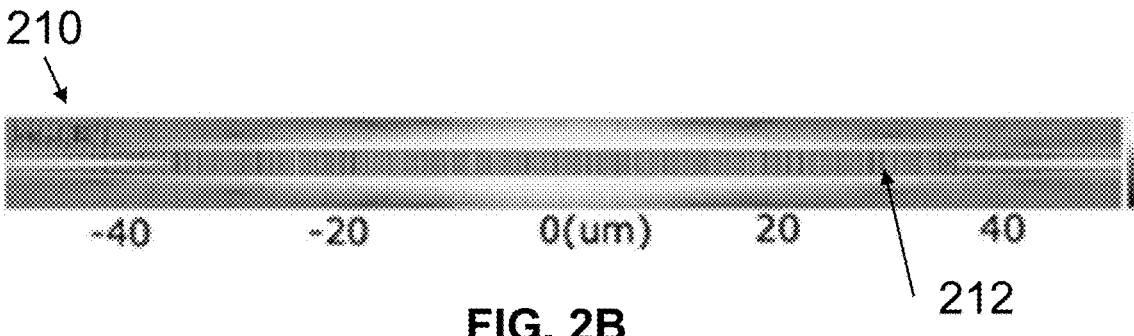
FIG. 2B depicts an exemplary photonic crystal cavity region for use in a photonic crystal modulator, in accordance with one or more examples of the disclosure.

FIG. 2B depicts an exemplary photonic crystal cavity region 210 for use in a photonic crystal modulator, in accordance with one or more examples of the disclosure. The cavity region 210 can include a fabricated mirror structure. As shown in FIG. 2B, the cavity region 210 has a series of lines 212 running in parallel relative to one another throughout the length of the cavity region 210. The lines 212 can represent a periodic layering of materials. In one or more examples, the lines 212 can represent a periodic layering of silicon nitride and silicon dioxide. The periodic layering of materials represented by the lines 212 can be the fabricated mirror structure of the cavity region 210 that is altered by strain in the piezoelectric cantilevers 204 of FIG. 2A. That is, as strain is induced in the piezoelectric cantilevers 204, the mirror structure of the cavity region 210 can become deformed as the waveguide 208 deforms, which induces the optical change. Thus, in one or more examples, the effective index of refraction of the mirror structure of the cavity region 210 can be selectively controlled via strain-tuning by actuating the piezoelectric cantilevers 204. In some embodiments, the adjustment to the refractive index may be a result of a non-volatile strain tuning performed to cantilevers 204. The non-volatile strain tuning may be performed via mechanical hysteresis arising from non-linear mechanical buckling of the electrodes and/or from ferroelectric hysteresis of the piezoelectric layer of piezoelectric cantilevers 204.

Figure 3A:
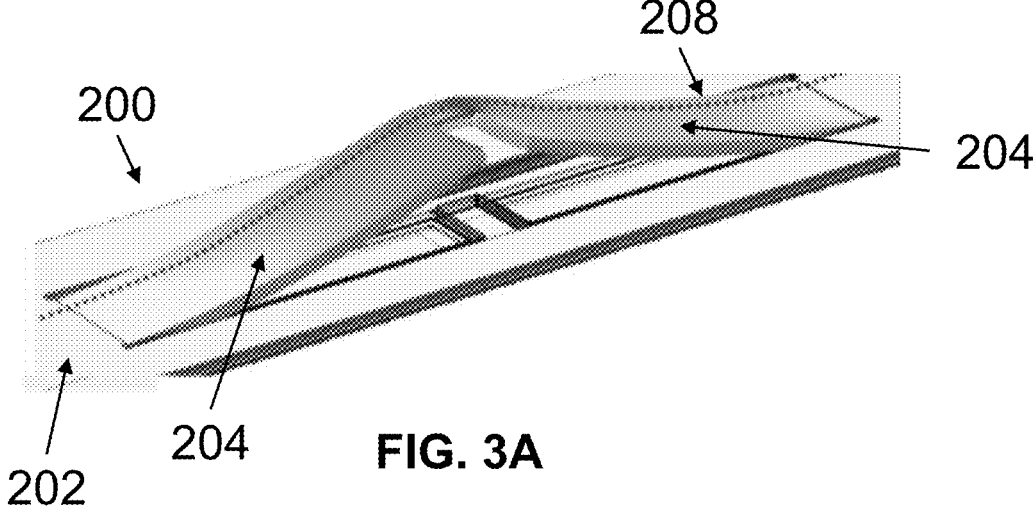
FIG. 3A depicts a ten-times scale of an exemplary piezo-actuated photonic crystal modulator, in accordance with one or more examples of the disclosure.

As discussed above, the piezoelectric cantilevers 204 of the modulator 200 can be actuated by applying an electrical signal to the modulator 200. Thus, the piezoelectric cantilevers 204 can be selectively shifted between an actuated state, where the electric signal has been applied, and a resting state, without any electrical signal applied. FIG. 3A depicts a ten-times scale of the modulator 200 in a piezo-actuated state, in accordance with one or more examples of the disclosure. When the modulator 200 is in the resting state, however, the modulator 200 can appear as depicted in FIG. 2A, with the cantilevers 204 and the waveguide 208 relatively co-planar with the substrate 202.

Figure 3B:
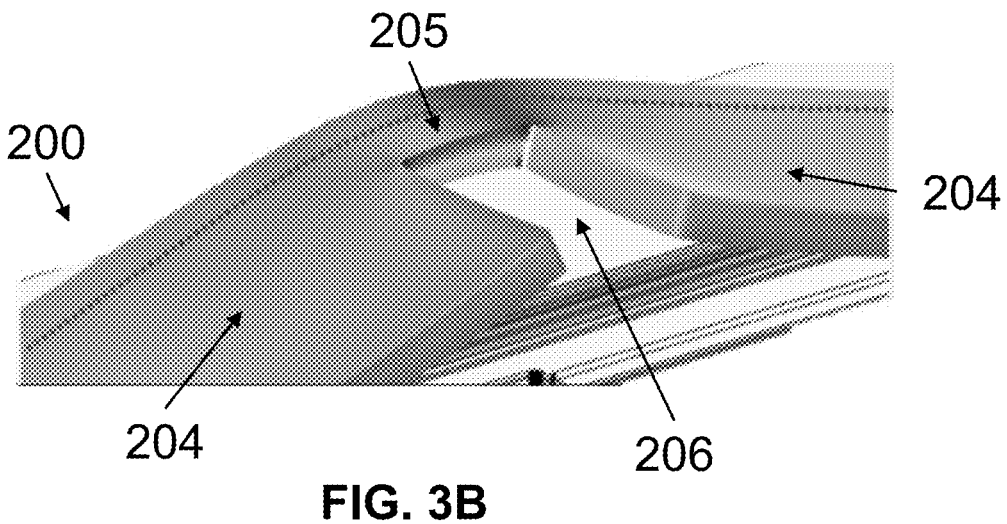
FIG. 3B depicts an exemplary detail view of a piezo-actuated photonic crystal modulator, in accordance with one or more examples of the disclosure.

As shown in FIG. 3A, the cantilevers 204 of the modulator 200 have mechanically deformed in an upward direction relative to the substrate 202 in an arching structure. The waveguide 208 (depicted here as a dotted line) acts as bridge over the arched cantilevers 204. This bridge configuration is shown more clearly in FIG. 3B, which depicts an exemplary detail view of the piezo-actuated modulator 200, in accordance with one or more examples of the disclosure. As shown clearly in FIG. 3B, the waveguide 208 bridges the gap 206 between the cantilevers 204 at a bridge area 205. In one or more examples, the bridge area 205 corresponds with the cavity region 210 discussed above. In the piezo-actuated configuration depicted in FIG. 3A, the modulator 200 can experience a peak stress at the bridge area 205. In one or more examples, the stress experienced at the bridge area 205 will vary depending on the amount of electrical signal applied to the modulator 200. For example, experimental modeling of the modulator 200 without any voltage applied to the modulator 200 revealed that the bridge area 205 may experience a peak stress of 890 N/mm². With 100 volts applied to the modulator 200, however, experimental modeling revealed that the peak stress experienced at the bridge area can be 3,000 N/mm². Thus, displacement and strain as a function of voltage predicts a 3.4× enhancement of the stress over the 0 V state. In one or more examples, passive film stresses can be optimized, with experimental modeling predicting that such optimized devices will exhibit a 20× stress enhancement.

As shown in FIGS. 2A-3B, the modulator 200 has a single piezoelectric PhC cavity and pair of piezoelectric cantilevers. Other geometric configurations, however, with additional piezoelectric PhC cavities, each with their own pair of piezoelectric cantilevers are also possible. In one or more examples, a single pair of piezoelectric cantilevers may be used to induce strain on more than one piezoelectric PhC cavity. Thus, the geometric configuration of the modulator 200 can be engineered, including fabricating an appropriate number of piezoelectric PhC cavities, according to the intended use.

Figure 4:
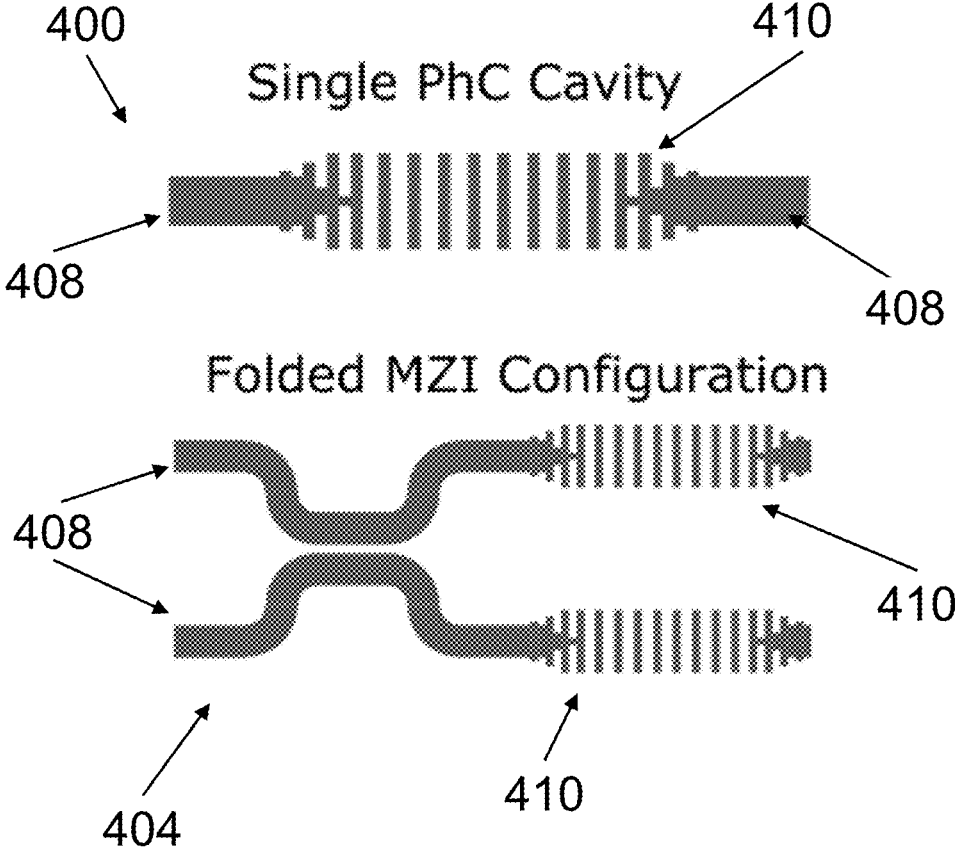
FIG. 4 depicts a single cavity configuration and a folded Mach-Zehnder interferometer cavity configuration for a photonic crystal cavity, in accordance with one or more examples of the disclosure.

FIG. 4 depicts a single cavity configuration 400 and a folded Mach-Zehnder interferometer (MZI) cavity configuration 404 for a photonic crystal cavity, in accordance with one or more examples of the disclosure. As shown in FIG. 4, the single cavity configuration 400 includes a waveguide 408 on either side of a cavity region 410. The folded MZI cavity configuration 404 includes two separate cavity regions 410 that are each connected to a waveguide 408. As shown in FIG. 2, the modulator 200 is configured in a single cavity configuration like the single cavity configuration 400 shown in FIG. 4. That is, the cavity region 410 can correspond to the cavity region 210 and the waveguide 408 can correspond to the waveguide 208 of the modulator 200 depicted in FIG. 2.

In one or more examples, the modulator 200 can be configured in the folded MZI cavity configuration 404. In such configuration, the modulator 200 can include two separate cavity regions 410 that correspond to the cavity region 210 shown in FIG. 2. In one or more examples, a photonic modulator that relies on a ring resonator or conventional MZI can require a larger footprint of a CMOS device. For example, to induce a significant phase shift in a ring resonator or conventional MZI device, it may be necessary to route a waveguide in a series of loops occupying a large area, which necessitates inducing a strain over that large area. Relying on a photonic crystal, however, can confine the optical mode to a small area, requiring inducing strain over only that small area. Relying on the small optical mode of the photonic crystal, and the piezo-actuation of the piezoelectric cantilevers to concentrate strain in the cavity region, as discussed above, can thus achieve large phase shifts in a relatively compact modulator. Thus, a modulator such as the modulator 200, configured in either the single cavity configuration 400 or the MZI cavity configuration 404 can be both compact and lower loss relative to other types of modulators.

As discussed above, in one or more examples, the strain induced on the piezoelectric cantilevers 204 of the modulator 200 by the application of an electrical signal (e.g., a voltage) can selectively control the transmission frequency of the cavity region 210, thus enabling the modulator 200 to act as a strain-tuned Bragg-grating type structure. In some embodiments, the adjustment to the refractive index may be a result of a non-volatile strain tuning performed to cantilevers 204. The non-volatile strain tuning may be performed via mechanical hysteresis arising from non-linear mechanical buckling of the electrodes and/or from ferroelectric hysteresis of the piezoelectric layer of piezoelectric cantilevers 204. That is, the transmission spectrum of a photonic crystal modulator such as the modulator 200 can be altered based on voltage applied to the modulator. In some embodiments, the resonant amplitude modulation caused may be in the 2.5-3.0 GHz spectral range and the frequency modulation/shifting may be between 2.5-3.0 GHz.

Figure 5:
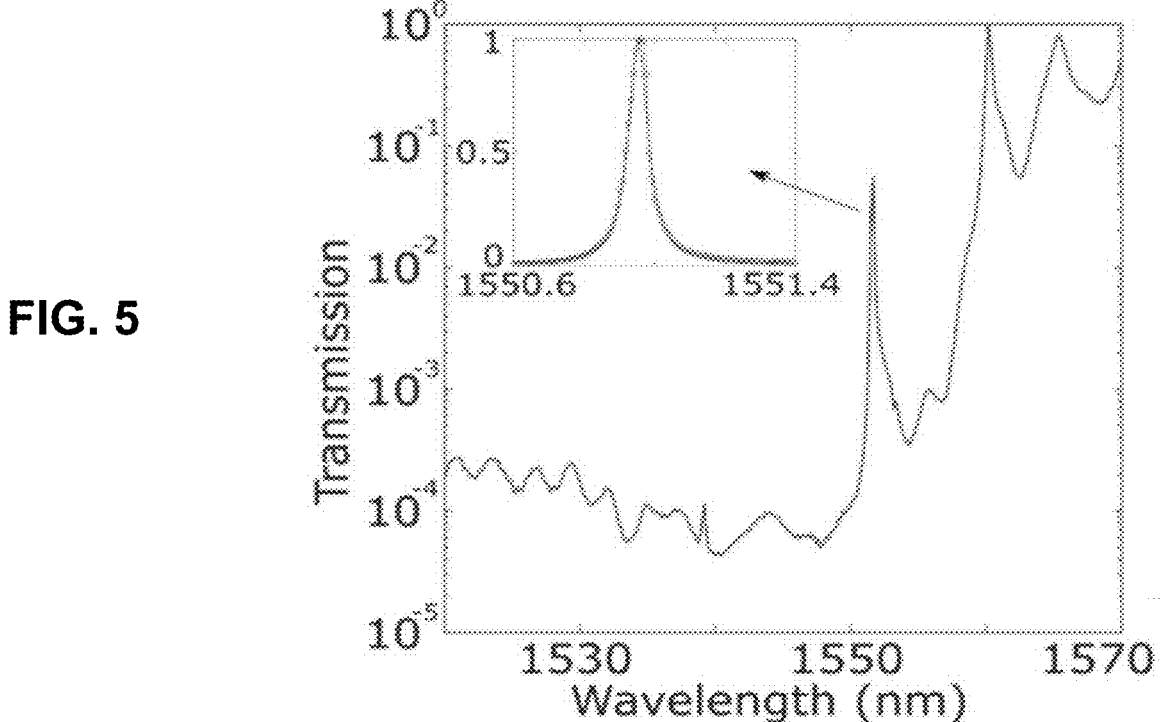
FIG. 5 depicts a transmission spectrum of a photonic crystal modulator, in accordance with one or more examples of the disclosure.

FIG. 5 depicts a transmission spectrum of a photonic crystal modulator, in accordance with one or more examples of the disclosure. As shown in FIG. 5 which graphically depicts the measured transmission spectrum of a single cavity configuration modulator, such as that shown if FIG. 4. As depicted in FIG. 5, the transmission spectrum indicates a large amount of optical loss may be exhibited depending on the wavelength of light sent through the modulator. For example, only 0.01% of light at 1530 nanometers sent through the modulator will be transmitted through the modulator. At around 1550 nanometers, however, there is a peak of transmission indicating that more light is transmitted through the modulator at that wavelength. Wavelengths where there is a jump in transmission can be referred to as "resonant" wavelengths. At each resonant wavelength, the waveguide may occupy a "stable" state, where coherence of the entangled qubits can be maintained.

In one or more examples, the transmission spectrum of an MZI cavity configuration modulator 404, such as that shown in FIG. 4, may differ from the transmission spectrum shown in FIG. 5 for a single cavity configuration modulator 400. In one or more examples, a directional coupler between the two photonic crystal cavities in the MZI cavity configuration can result in an asymmetric transmission spectrum. An MZI cavity configuration modulator can enable large extinction modulation via the formation of Fano resonances. Experimental measurements revealed a 26.5 dB extinction when applying 130 volts; however, in one or more examples, the extinction can be optimized by modifying the cantilever design. In some embodiments, the optimization may include the cantilever design being modified to incorporate strain concentration geometries. Furthermore, in some embodiments, the optimization may include passive film stresses being engineered so as to prevent contact with the bottom substrate. This can increase the range of actuation of the modulator 400.

Figure 6:
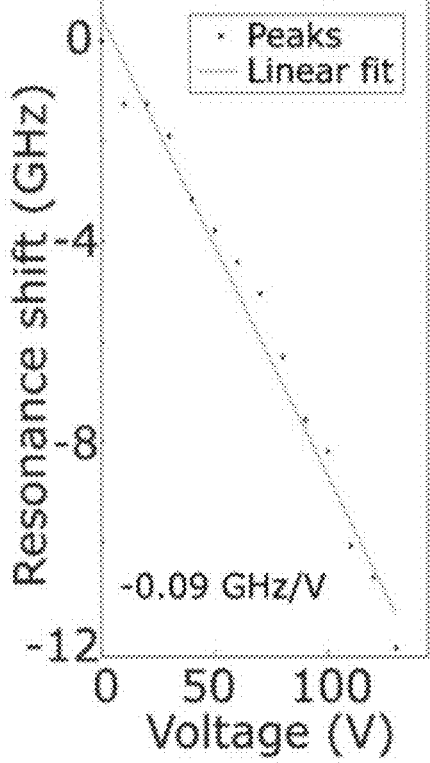
FIG. 6 depicts a linear fit of a DC voltage sweep showing resonance shift of a photonic crystal modulator as a function of voltage, in accordance with one or more examples of the disclosure.

In one or more examples, the application of voltage can effectively shift the wavelength of the peak of transmission, as shown in FIG. 6, which depicts a linear fit of a DC voltage sweep showing resonance shift of a photonic crystal modulator as a function of voltage, in accordance with one or more examples of the disclosure. As shown in FIG. 6, the resonance shift (and the transmission peak) is a function of the voltage applied to the PhC modulator. Accordingly, a PhC modulator according to the present disclosure can be used to shift the frequency of light to an appropriate resonant frequency that allows for a large amount of transmission (i.e., low-loss) through the modulator. For example, the frequency shift may be of the order of gigahertz (e.g., 2.5-3.0 GHz). For quantum applications, the frequency modulation being capable of reaching the gigahertz levels enables frequency shifting of photons for frequency multiplexing and controlling the spectral indistinguishability of photons. These capabilities also have various applications for classical photonics-based RF signal processing such as narrowband filtering and RF-over-fiber applications.

As discussed above, the mechanical actuation from the application of an electrical signal to the piezoelectric cantilevers 204 shown in FIG. 2A can induce strain in the PhC cavity and thereby alter the index of refraction of the modulator. This electrical actuation can be enabled via the use of piezoelectric materials in the piezoelectric cantilevers that can generate an electric field when an electrical signal is applied to the cantilevers.

Figure 7:
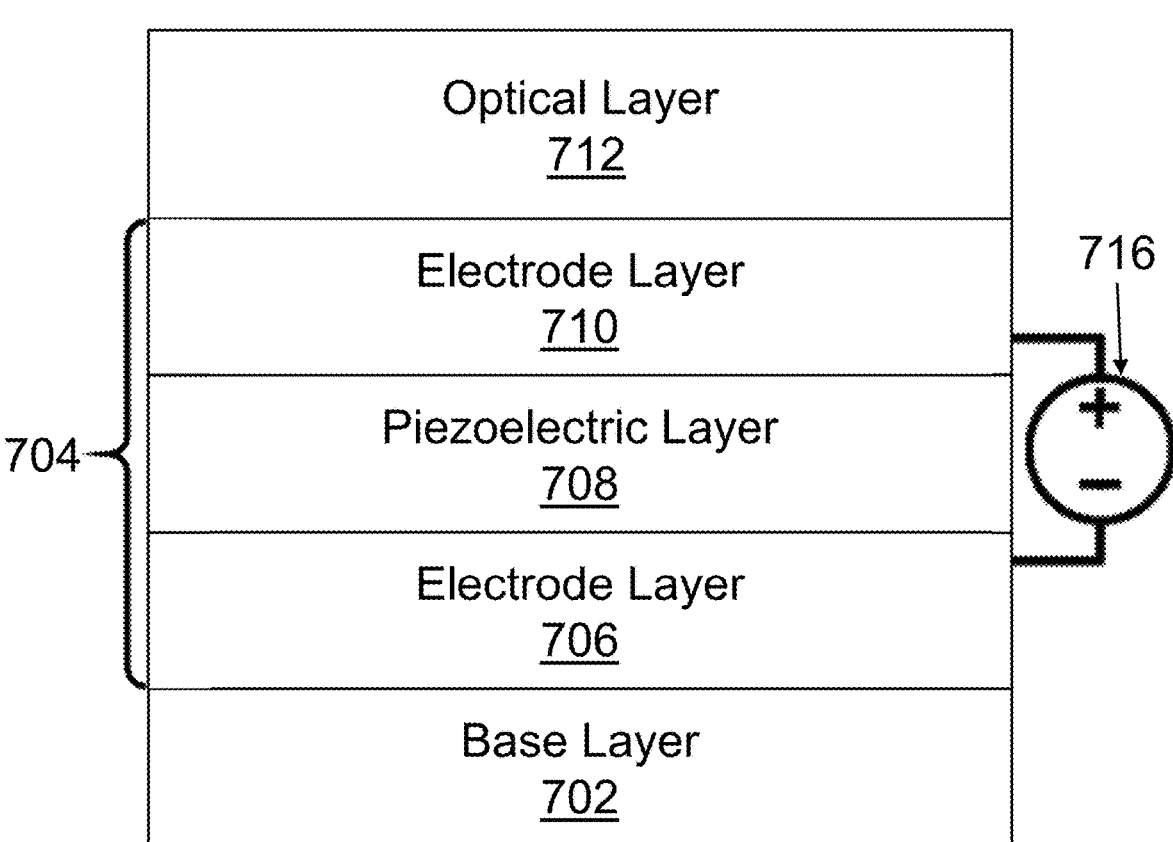
FIG. 7 depicts a cross-sectional view of an exemplary piezoelectric cantilever system, in accordance with one or more examples of the disclosure.

FIG. 7 depicts a cross-sectional view of an exemplary piezoelectric cantilever system 700, in accordance with one or more examples of the disclosure. Specifically, FIG. 7 illustrates a side view cross-section of a piezoelectric cantilever system 700 comprising multiple layers: a base layer 702; a piezoelectric cantilever 704 comprising a first electrode layer 706, a piezoelectric layer 708, and a second electrode layer 710; and an optical layer 712. The piezoelectric cantilever system 700 may be configured to electrically couple to a DC power source 716. In one or more examples, the piezoelectric cantilever system 700 can be used in the modulator 200 shown in FIG. 2. In one or more examples, the piezoelectric cantilever system 700 may be configured to operate in a cryogenic environment.

As shown, the base layer 702 may be positioned below the piezoelectric cantilever 704 and/or the optical layer 712. In one or more examples, the base layer 702 may comprise silicon dioxide or amorphous silicon. The base layer 702 may be a sacrificial layer added during fabrication of the piezoelectric cantilever 700 and configured to be removed in order to create a gap between piezoelectric cantilever 700 and another surface (e.g., another component of a quantum computing system). This gap may provide the space necessary for the piezoelectric cantilever 700 to deflect downward. In one or more examples, the base layer 702 may be between 150 nm and 1,000 nm thick.

The piezoelectric cantilever 704 may be disposed atop the base layer 702. In particular, in one or more examples, the first electrode layer 706 may be positioned atop the base layer 702 and below the piezoelectric layer 708, the second electrode layer 710, and/or the optical layer 712. The first electrode layer 706 may be an electrical conductor. In one or more examples, the first electrode layer 706 may be an anode or a cathode. The first electrode layer 706 may comprise aluminum or another metal or conductive material. In one or more examples, first electrode layer 706 may be between 100 nm and 300 nm thick.

In one or more examples, the piezoelectric layer 708 may be positioned atop the base layer 702 and/or the first electrode layer 706 and below the second electrode layer 710 and/or the optical layer 712. In one or more examples, generation of an electric field inside the piezoelectric layer 708 may cause the piezoelectric layer 708 to mechanically deform. This mechanical deformation may cause the piezoelectric cantilever 704 to deflect away from an equilibrium or resting position (e.g., away from the position the piezoelectric cantilever 704 occupies when there is no electric field generated inside the piezoelectric layer 708). The piezoelectric layer 708 may comprise piezoelectric material(s), which maintain necessary piezoelectric properties at cryogenic temperatures. In one or more examples, the piezoelectric layer 708 may comprise aluminum nitride, doped variants of aluminum nitride, or another piezoelectric material. In one or more examples, the piezoelectric layer 708 may be between 400 nm and 500 nm thick.

In one or more examples, the second electrode layer 710 may be positioned atop the base layer 702, the first electrode layer 706, and/or the piezoelectric layer 708 and below the optical layer 712. The second electrode layer 710 may be an electrical conductor. In one or more examples, the second electrode layer 710 may be an anode or a cathode. The second electrode layer 710 may comprise aluminum or another metal or conductive material. In one or more examples, the second electrode layer 710 may be between 100 nm and 300 nm thick.

The optical layer 712 may be disposed atop the piezoelectric cantilever 704 and/or the base layer 702. In particular, in one or more examples, the optical layer 712 may be positioned atop the base layer 702, the first electrode layer 706, the piezoelectric layer 708, and/or the second electrode layer 710. The optical layer 712 may comprise a photonic waveguide, such as the photonic waveguide 208 of the modulator 200 depicted in FIG. 2.

In one or more examples, the DC power source 716 may comprise one or more batteries or an AC/DC power supply. The DC power source 716 may be configured generate a voltage across the piezoelectric cantilever 704 in order to create an electric field inside the piezoelectric layer 708, thereby causing the piezoelectric layer 708 to mechanically deform. In one or more examples, generating a voltage across the piezoelectric cantilever 704 using the DC power source 716 may comprise connecting (i.e., electrically coupling) a first terminal of the DC power source 716 to the first electrode layer 706 and a second terminal of the DC power source 716 to the second electrode layer 710. In one or more examples, the first terminal may be negatively charged and the second terminal may be positively charged (or vice versa). Connecting the first and second terminals of the DC power source 716 to the first electrode 706 and the second electrode 710, respectively, may cause charge to build up on the first electrode 706 and an opposite charge to build up on the second electrode 710. This build-up of opposing charges may create an electric field within the piezoelectric layer 708. In one or more examples, the strength of the electric field that is created within the piezoelectric layer 708 may depend on the voltage supplied by the DC power source 716. The degree and direction of the mechanical deformation of the piezoelectric layer 708 may, in turn, depend on the strength of the electric field created within the piezoelectric layer 708, and thus the voltage supplied by the DC power source 716.

In one or more examples, the modulator, such as the modulator 200 of FIG. 2, can also be operated using an AC voltage. Thus, in one or more examples, the method 1000 of FIG. 10 can be performed using an AC power source in place of the DC power source 716. When the modulator 200 is driven with an AC voltage at one of the mechanical resonance frequencies, it has been shown that the device can achieve more than a 5 dB enhancement in the modulation amplitude when compared to the same voltage budget in DC operation. Furthermore, each resonance frequency may correspond to a stable state of the waveguide, which can increase coherence times. Furthermore, in some embodiments, the modulation amplitude may occupy the 2.5-3.0 GHz spectral range. In one or more examples, applying an AC voltage can enable leveraging the mechanical resonance of the device for enhanced modulation with lower voltage. Thus, in one or more examples, AC modulation can amplify the strain-optic/deformation behavior of the piezoelectric cantilever, such as the piezoelectric cantilever 704.

In one or more examples, the photonic crystal modulator, such as the modulator 200 of FIG. 2, can be operated using non-volatile strain tuning of PhC optical resonance. Non-volatile strain tuning can be performed via mechanical hysteresis arising from non-linear mechanical buckling (e.g., plastic deformation and cycle loading of the top and bottom metals (i.e., the electrode layers 706 and 710)), and/or from ferroelectric hysteresis of the piezoelectric layer (i.e., the piezoelectric cantilever 704). In one or more examples, the piezoelectric layer can exhibit ferroelectricity at high voltages and for certain dopants, such as Scandium. In one or more examples, non-volatile strain tuning can result in a 5 dB optical contrast. This phenomena can enable post fabrication trimming of the cavity resonance and non-volatile memory functionality. In one or more examples, non-volatility can enable the shifting of the passive resonance frequency by applying a sufficiently large voltage (such as greater than 90 volts or less than negative 90 volts) such that when the voltage is removed (i.e., at 0 volts) the resonance frequency remains shifted.

Figures 8A, 8B:
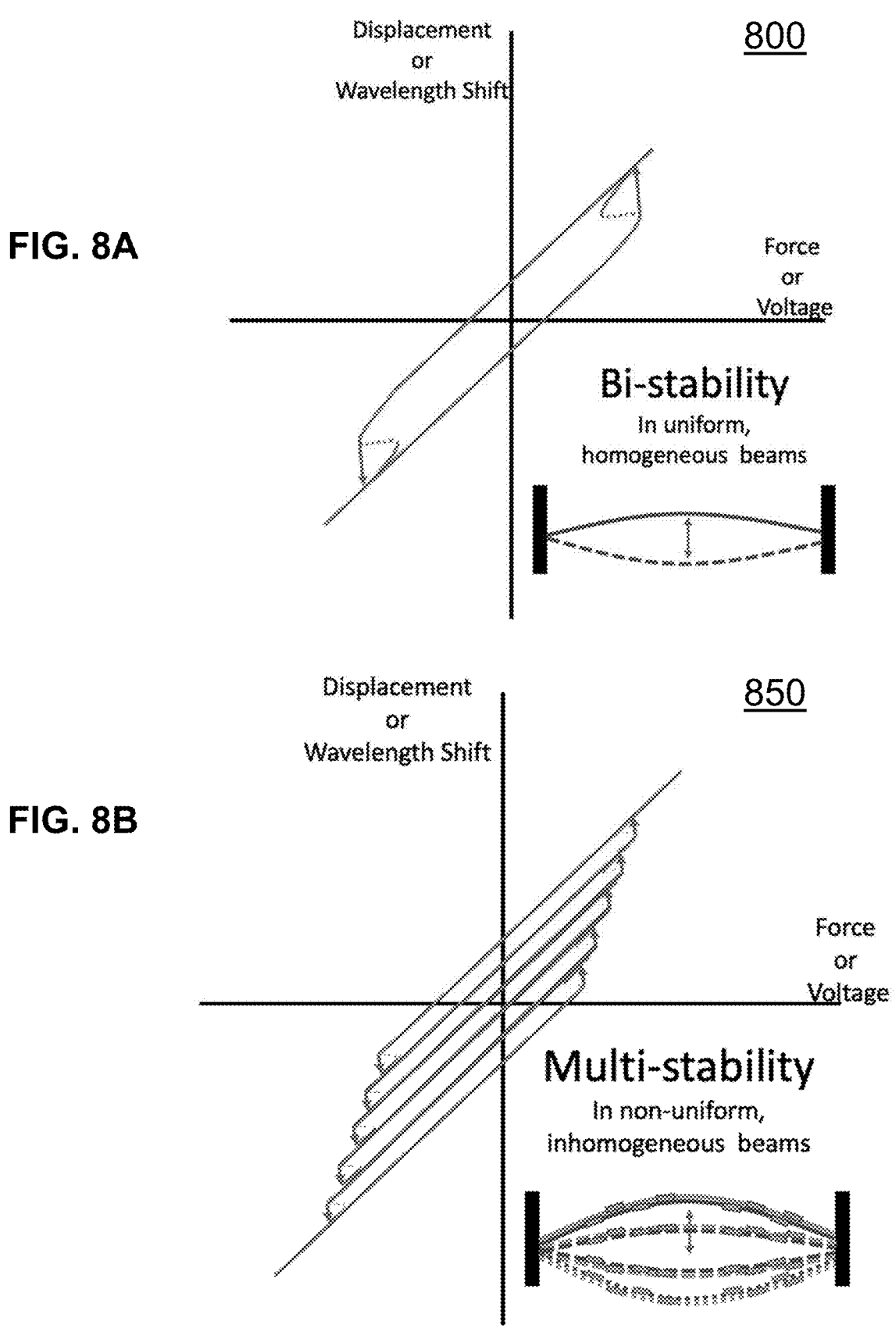
FIGS. 8A-8B illustrate plots of nonlinear mechanical buckling based on mechanical bi-stability and multi-stability, respectively, in accordance with one or more examples of the disclosure.

FIGS. 8A-8B illustrate plots 800 and 850 of nonlinear mechanical buckling based on mechanical bi-stability and multi-stability, respectively, in accordance with one or more examples of the disclosure. In one or more examples, as seen in plot 800 of FIG. 8A, nonlinear mechanical buckling is based on mechanically bi-stability inherent in a simple, axially loaded beam. Which of the two stable states the device ends up in will be affected by a particular accumulation of the loading history. This bi-stability can be generalized into a multi-stability, as illustrated by plot 850 of FIG. 8B. In one or more examples, the bi-stability can be generalized into a multi-stability by breaking the uniformity and homogeneity of the beam such as by varying the width along the length and adding multiple materials layers of varying compositions, thicknesses, and stiffnesses. In the case of the photonic crystal waveguide, the large number of periodic alternations of silicon dioxide and silicon nitride can itself contribute to the non-uniformity and inhomogeneity that can achieve multi-stability. The number of stable solutions grows proportionally with the number of geometric and material variations along the beam. Additional mechanical nonlinearities such as material plasticity and ferroelectric hysteresis similarly can contribute to the inhomogeneity of the structure, further multiplying the density of stable states. If the density of states becomes high enough, the device can behave as if it is continuously stable.

In response to the mechanical deformation induced in the piezoelectric layer 708, the piezoelectric cantilever 704 may deflect away from an equilibrium position. For example, the piezoelectric cantilever 704 may flex in an upward direction or in a downward direction. In one or more examples, the piezoelectric cantilever 704 can be mechanically coupled to a photonic waveguide, such as the photonic waveguide 208 of the modulator 200 depicted in FIG. 2. Mechanical coupling between the piezoelectric cantilever 704 and a photonic waveguide may induce an optical change in the photonic waveguide when the piezoelectric cantilever 704 deflects. In one or more examples, deflection of the piezoelectric cantilever 704 (and/or strain induced because of that deflection) can alter a refractive index of a photonic waveguide that is mechanically coupled to the piezoelectric cantilever 704. Altering the refractive index of the mechanically coupled photonic waveguide can alter the resonant frequency of the photonic waveguide, as discussed above. Thus, the mechanical deformation caused by actuating the piezoelectric cantilever 704 can induce an optical change (i.e., modulate) light that is directed through a modulator such as the modulator 200 of FIG. 2.

FIGS. 9A-9D illustrate plots 900-930 relating to pre-equalization of waveforms, in accordance with one or more examples of the disclosure. In situations where the strongly resonant nature of the modulator resulting in large ringing artifacts, especially in cases of a pseudorandom binary sequence (PRBS) or other arbitrary waveform modulation, compensation can be performed by pre-filtering the modulating signal to equalize the final output waveform. This is achieved by obtaining and updating the complex S21 transfer function (amplitude and phase) of the device either by periodic single tone sweeping using a vector network analyzer or direct calculation using the output of the device to a broadband PRBS or white noise input. For high-frequency systems, such as that described by plots 900-930, the system can be described in terms of waves instead of voltages and currents, and "S21" indicates that the transmission is a forward transmission (e.g., from port 1 to port 2). A transfer function can be used to describe the relationships between the input side and the output side of the system.

Figures 9A, 9B:
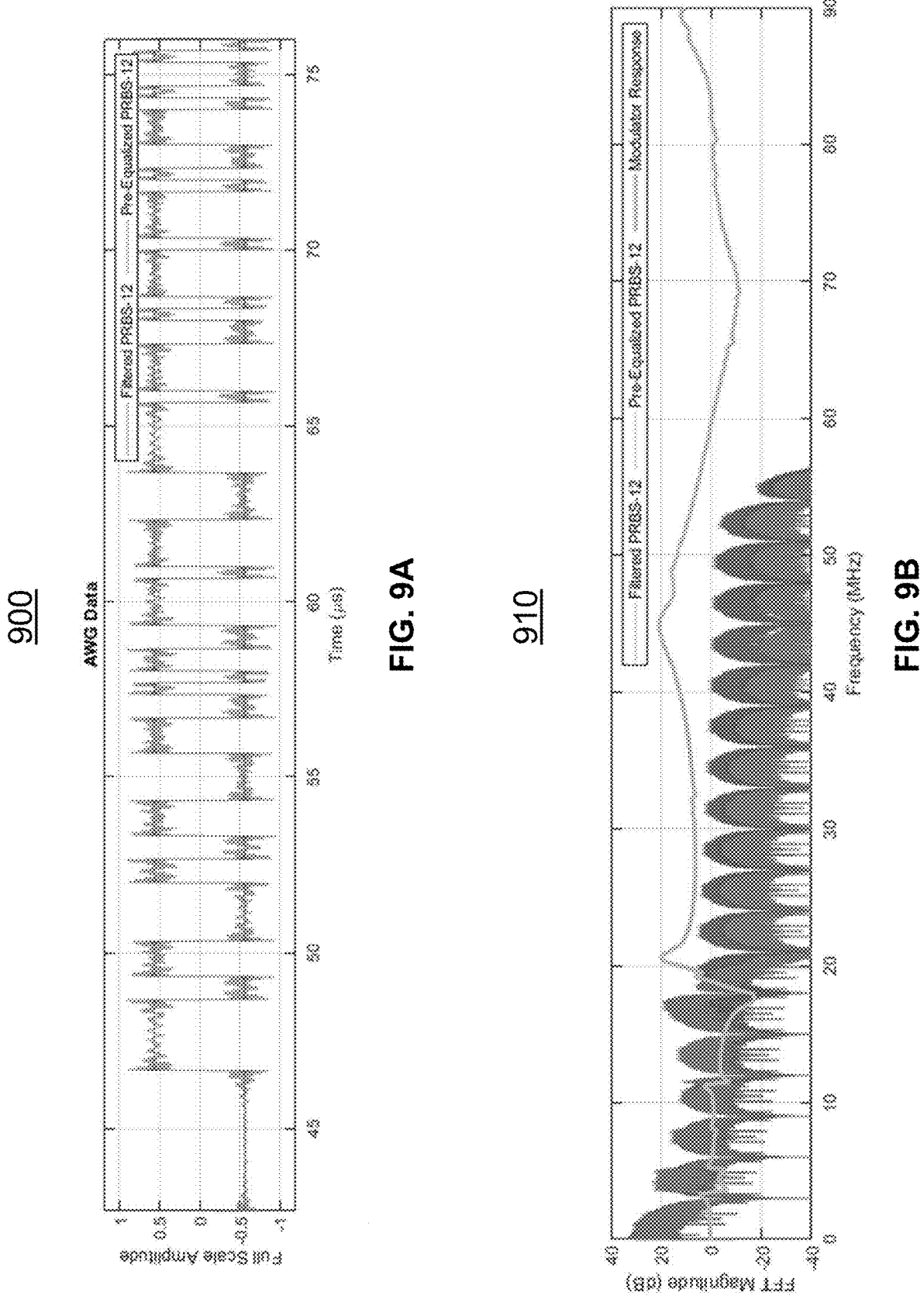
FIGS. 9A-9D illustrate plots relating to pre-equalization of waveforms, in accordance with one or more examples of the disclosure.
Figures 9C, 9D:
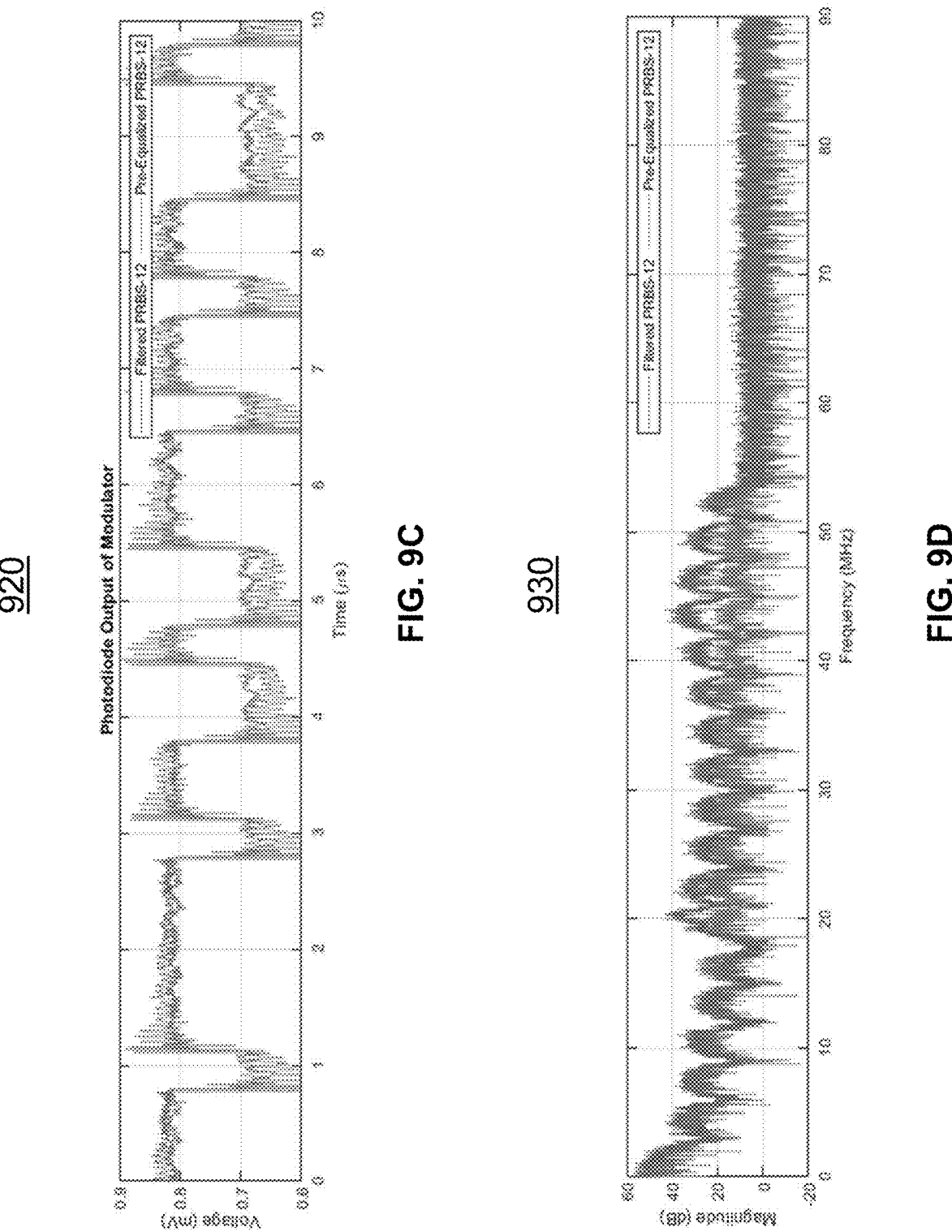

In plot 900 of FIG. 9A, the standard PRBS waveform is depicted in grey and the pre-equalized waveform in red. In plot 910 of FIG. 9B, the spectral power density of the two waveforms is depicted in blue and red, respectively. In some examples, with respect to FIG. 9B, the density spectrum in red is equivalent to the density spectrum in blue divided by the yellow device response spectrum. In plots 920-930 of FIGS. 9C-9D, the modulator's photodiode output is depicted. In particular, with respect to plots 920-930, the un-equalized and equalized experimental modulator's photodiode output is depicted in blue and red, respectively.

FIG. 10 depicts an exemplary method 1000 for modulating light directed through a piezoelectric photonic crystal modulator, in accordance with one or more examples of the disclosure. In one or more examples, the method 1000 can be used to control a photonic modulator such as the photonic modulator 200 described above. Thus, in one or more examples, the method 1000 can be used to modulate a silicon nitride photonic crystal cavity using piezo-mechanical actuators fabricated in a broadband CMOS platform.

The method can begin at step 1002 with inputting light into the modulator with a wavelength that corresponds to one of the resonant modes of the photonic crystal cavity of the modulator. Step 1002 can include inputting light that corresponds to one of the resonant modes of the photonic crystal cavity region 210 of the modulator 200. In one or more examples, inputting light at step 1002 can involve selecting a desired resonant frequency for a photonic waveguide of the modulator. For example, the desired resonant frequency may be in the 2.5-3.0 GHz spectral range. As discussed above, the amount of light transmitted through a PhC modulator can vary based on the transmission spectrum of the light, with some wavelengths (e.g., resonant wavelengths) exhibiting that a greater amount of light will be transmitted relative to non-resonant wavelengths. Thus, selecting a desired resonant frequency at step 1002 can include determining and selecting a frequency that will exhibit low-loss of light directed through the modulator. In one or more examples, inputting light into the modulator at step 1002 can involve determining a desired modulation frequency and amplitude, i.e., identifying the modulation frequency and amplitude that corresponds with one of the resonant modes of the photonic crystal cavity of the modulator.

After inputting light into the modulator at step 1002, the method 1000 can move to step 1004 and determine an electrical signal to apply to the piezoelectric cantilevers of the photonic waveguide. In one or more examples, the electrical signal determined at step 1004 can be based on the desired modulation frequency and amplitude determined after inputting light into the modulator at step 1002. As discussed above, the resonant frequency of a PhC modulator such as modulator 200 can be shifted based on voltage applied to the modulator. Thus, determining the electrical signal to apply at step 1004 can involve consulting experimental data to determine what electrical signal applied to the modulator will shift the resonant frequency to a desired modulation frequency and/or amplitude. In some embodiments, predetermined electrical signals and signal patterns may be stored in a data structure. In operation, programming may be executed based on the electrical signals and signal patterns stored in the data structure to cause the electrical signals to be applied to the piezoelectric cantilevers.

After determining the electrical signal to apply at step 1004, the method 1000 can proceed to step 1006 and apply the determined electrical signal to one or more electrodes communicatively coupled to the piezoelectric cantilevers of the photonic waveguide. The electrical signal can be applied to electrodes of a photonic modulator such as the modulator 200. Thus, in one or more examples, the electrical signal can be applied to the modulator 200 via electrodes that are communicatively coupled to the one or both of the piezoelectric cantilevers 204. In one or more examples, the electrical signal can be a direct current (DC) signal. In one or more examples, the electrical signal can be an alternative current (AC) signal.

Figure 11:
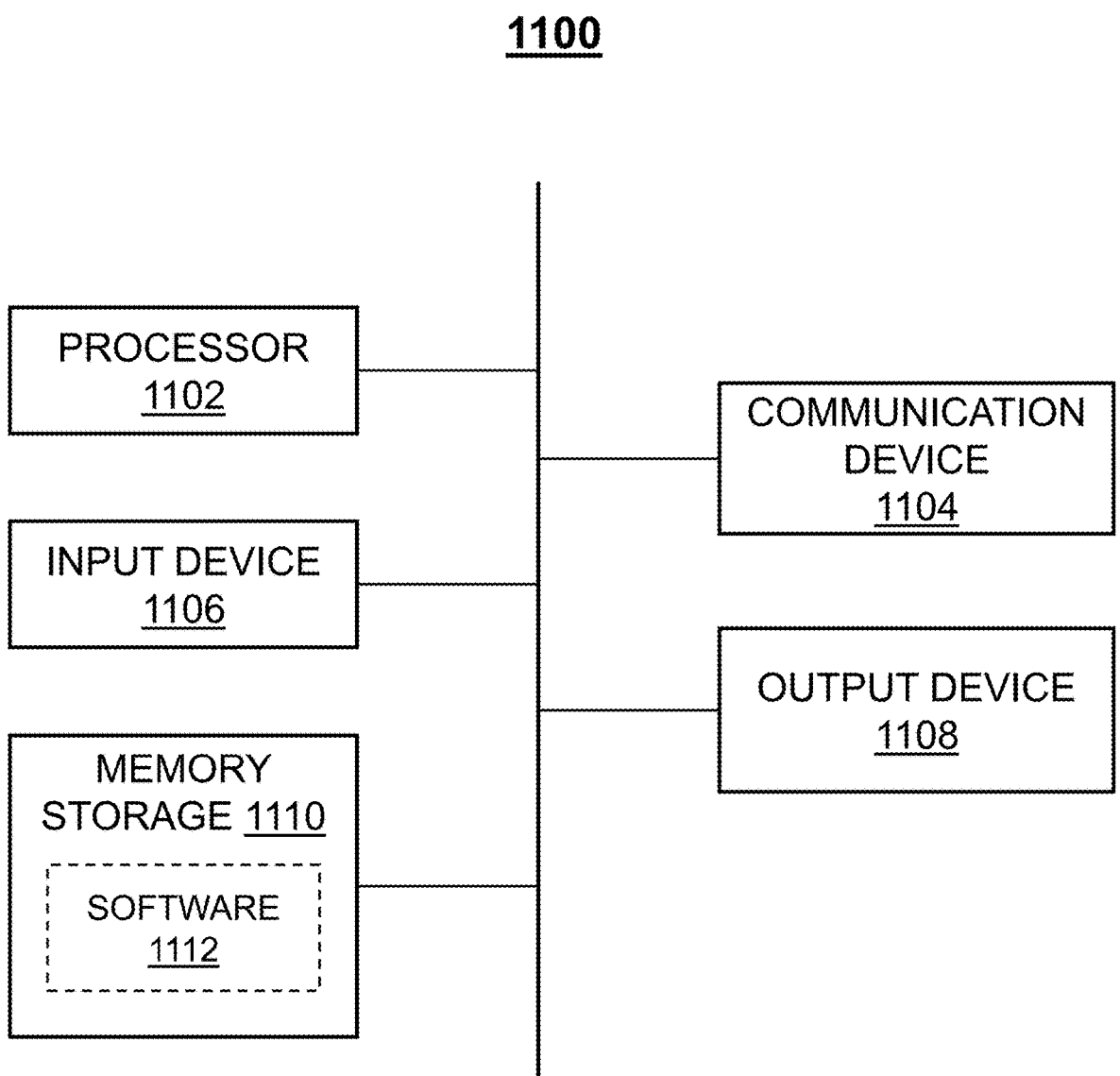
FIG. 11 illustrates an exemplary computing device, in accordance with one or more examples of the disclosure.

FIG. 11 illustrates an exemplary computing device 1100, in accordance with one or more examples of the disclosure. In some embodiments, computing device 1100 may be used to implement classical layer 102 and/or classical-quantum interface 104, or another components of system 100. Device 1100 can be a host computer connected to a network. Device 1100 can be a client computer or a server. As shown in FIG. 11, device 1100 can be any suitable type of microprocessor-based device, such as a personal computer, workstation, server, or handheld computing device (portable electronic device) such as a phone or tablet. The device can include, for example, one or more of processors 1102, input device 1106, output device 1108, storage 1110, and communication device 1104. Input device 1106 and output device 1108 can generally correspond to those described above and can either be connectable or integrated with the computer.

Input device 1106 can be any suitable device that provides input, such as a touch screen, keyboard or keypad, mouse, or voice-recognition device. Output device 1108 can be any suitable device that provides output, such as a touch screen, haptics device, or speaker.

Storage 1110 can be any suitable device that provides storage, such as an electrical, magnetic, or optical memory, including a RAM, cache, hard drive, or removable storage disk. Communication device 1104 can include any suitable device capable of transmitting and receiving signals over a network, such as a network interface chip or device. The components of the computer can be connected in any suitable manner, such as via a physical bus or wirelessly.

Software 1112, which can be stored in storage 1110 and executed by processor 1102, can include, for example, the programming that embodies the functionality of the present disclosure (e.g., as embodied in the devices as described above).

Software 1112 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1110, that can contain or store programming for use by or in connection with an instruction execution system, apparatus, or device.

Software 1112 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1100 can implement any operating system suitable for operating on the network. Software 1112 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A photonic modulator comprising:
 a photonic waveguide;
 a first piezoelectric cantilever, wherein at least a portion of the first piezoelectric cantilever is configured to move away from a substrate based on an electrical signal being applied to the first piezoelectric cantilever;
 a second piezoelectric cantilever, wherein at least a portion of the second piezoelectric cantilever is configured to move away from the substrate based on the electrical signal being applied to the second piezoelectric cantilever, wherein the first and second piezoelectric cantilevers are spaced apart, and wherein the photonic waveguide bridges the gap formed by the first piezoelectric cantilever and the second piezoelectric cantilever; and
 one or more electrodes, wherein each electrode is communicatively coupled to at least one of the first piezoelectric cantilever or the second piezoelectric cantilever, and wherein the one or more electrodes are configured to receive the electrical signal applied to at least one of the first piezoelectric cantilever or the second piezoelectric cantilever to cause at least the portion of the first piezoelectric cantilever and/or at least the portion of the second piezoelectric cantilever to move away from the substrate such that a refractive index of the photonic waveguide is altered as a result of the movement of at least one of the first piezoelectric cantilever or the second piezoelectric cantilever.

2. The photonic modulator of claim 1, wherein the substrate comprises a complementary metal-oxide-semiconductor compatible material.

3. The photonic modulator of claim 1, wherein the photonic waveguide comprises a silicon nitride waveguide.

4. The photonic modulator of claim 3, wherein the photonic waveguide comprises a silicon dioxide cladding.

5. The photonic modulator of claim 1, wherein the first and second piezoelectric cantilevers comprise an aluminum nitride piezoelectric stack.

6. The photonic modulator of claim 5, wherein the first and second piezoelectric cantilevers are disposed such that the photonic waveguide is physically deformed when an electrical signal is applied to the one or more electrodes that are communicatively coupled to at least one of the first piezoelectric cantilever or the second piezoelectric cantilever.

7. The photonic modulator of claim 1, wherein the electrical signal applied to the one or more electrodes is a direct current (DC) signal.

8. The photonic modulator of claim 1, wherein the electrical signal applied to the one or more electrodes is an alternating current (AC) signal.

9. The photonic modulator of claim 1, wherein the photonic waveguide comprises a cavity region that is located on a portion of the photonic waveguide that bridges the gap.

10. The photonic modulator of claim 9, wherein the cavity region comprises layers of silicon nitride and silicon dioxide.

11. The photonic modulator of claim 1, wherein the electrical signal to be applied to the at least one of the first piezoelectric cantilever or the second piezoelectric cantilever is selected based on a desired resonant frequency for the photonic waveguide.

12. The photonic modulator of claim 11, wherein the desired resonant frequency is between 2.5 and 3.0 GHz.

13. The photonic modulator of claim 11, wherein the electrical signal causes a frequency modulation of between 2.5 and 3.0 GHz.

14. The photonic modulator of claim 1, wherein the photonic modulator is operated using non-volatile strain tuning performed via mechanical hysteresis.

15. The photonic modulator of claim 14, wherein the mechanical hysteresis arises from non-linear mechanical buckling of the one or more electrodes or from ferroelectric hysteresis of at least one of the first piezoelectric cantilever or the second piezoelectric cantilever.

16. A method for controlling a photonic modulator, the method comprising:
 applying an electrical signal to the photonic modulator, wherein the photonic modulator comprises:
  a photonic waveguide;
  a first piezoelectric cantilever, wherein at least a portion of the first piezoelectric cantilever is configured to move away from a substrate based on the electrical signal being applied to the first piezoelectric cantilever;
  a second piezoelectric cantilever, wherein at least a portion of the second piezoelectric cantilever is configured to move away from the substrate based on the electrical signal being applied to the second piezoelectric cantilever, wherein the first piezoelectric cantilever and the second piezoelectric cantilever are spaced apart by a gap, and wherein the photonic waveguide bridges the gap formed by the first piezoelectric cantilever and the second piezoelectric cantilever; and
  one or more electrodes, wherein each electrode is communicatively coupled to at least one of the first piezoelectric cantilever or the second piezoelectric cantilever or both, and wherein the one or more electrodes are configured to receive the electrical signal applied to at least one of the first piezoelectric cantilever or the second piezoelectric cantilever to cause at least the portion of the first piezoelectric cantilever and/or the second piezoelectric cantilever to move away from the substrate such that a refractive index of the photonic waveguide is altered as a result of the movement of the at least one of the first piezoelectric cantilever or the second piezoelectric cantilever;

wherein applying the electrical signal comprises:

selecting a desired resonant frequency for the photonic waveguide;

determining the electrical signal to apply to the first piezoelectric cantilever and the second piezoelectric cantilever based on the selected desired resonant frequency for the photonic waveguide; and applying the determined electrical signal to the one or more electrodes of the photonic modulator based on the determined electrical signal.

17. The method of claim 16, wherein the substrate comprises a complementary metal-oxide-semiconductor compatible material.

18. The method of claim 16, wherein the photonic waveguide comprises a silicon nitride waveguide.

19. The method of claim 18, wherein the photonic waveguide comprises a silicon dioxide cladding.

20. The method of claim 16, wherein the first and second piezoelectric cantilevers comprise an aluminum nitride piezoelectric stack.

21. The method of claim 20, wherein the first and second piezoelectric cantilevers are disposed such that the photonic waveguide is physically deformed based on the electrical signal being applied to the one or more electrodes that are communicatively coupled to at least one of the first piezoelectric cantilever or the second piezoelectric cantilever.

22. The method of claim 16, wherein the electrical signal applied to the one or more electrodes is a direct current (DC) signal.

23. The method of claim 16, wherein the electrical signal applied to the one or more electrodes is an alternating current (AC) signal.

24. The method of claim 16, wherein the photonic waveguide comprises a cavity region that is located on a portion of the photonic waveguide that bridges the gap.

25. The method of claim 24, wherein the cavity region comprises layers of silicon nitride and silicon dioxide.

26. The method of claim 16, wherein the desired resonant frequency is between 2.5 and 3.0 GHz.

27. The method of claim 16, wherein the electrical signal causes a frequency modulation of between 2.5 and 3.0 GHz.

28. The method of claim 16, wherein the photonic modulator is operated using non-volatile strain tuning performed via mechanical hysteresis.

29. The method of claim 28, wherein the mechanical hysteresis arises from non-linear mechanical buckling of the one or more electrodes or from ferroelectric hysteresis of at least one of the first piezoelectric cantilever or the second piezoelectric cantilever.

30. A non-transitory computer readable storage medium storing one or more programs for controlling a photonic modulator, for execution by one or more processors of an electronic device that when executed by the device, causes the device to:

apply an electrical signal to the photonic modulator, wherein the photonic modulator comprises:

a photonic waveguide;

a first piezoelectric cantilever, wherein at least a portion of the first piezoelectric cantilever is configured to move away from a substrate based on the electrical signal being applied to the first piezoelectric cantilever;

a second piezoelectric cantilever, wherein at least a portion of the second piezoelectric cantilever is configured to move away from the substrate based on the electrical signal being applied to the second piezoelectric cantilever, wherein the first piezoelectric cantilever and the second piezoelectric cantilever are spaced apart by a gap, and wherein the photonic waveguide bridges the gap formed by the first piezoelectric cantilever and the second piezoelectric cantilever; and one or more electrodes, wherein each electrode is communicatively coupled to at least one of the first piezoelectric cantilever or the second piezoelectric cantilever or both, and wherein the one or more electrodes are configured to receive the electrical signal applied to at least one of the first piezoelectric cantilever or the second piezoelectric cantilever to cause at least the portion of the first piezoelectric cantilever and/or the second piezoelectric cantilever to move away from the substrate such that a refractive index of the photonic waveguide is altered as a result of the movement of the at least one of the first piezoelectric cantilever or the second piezoelectric cantilever;

wherein the electrical signal being applied comprises the device being caused to:

select a desired resonant frequency for the photonic waveguide;

determine the electrical signal to apply to the first piezoelectric cantilever and the second piezoelectric cantilever based on the selected desired resonant frequency for the photonic waveguide; and apply the determined electrical signal to the one or more electrodes of the photonic modulator based on the determined electrical signal.

* * * * *